(No Model.)

J. S. WATSON & C. S. AMBURSTER.
FURROWER, MARKER, AND COVERER.

No. 395,602. Patented Jan. 1, 1889.

WITNESSES:
L. Douville
Wm. D. Moore

INVENTORS:
Jeremiah S. Watson
Charles S. Amburster
BY Wiedersheim & Fairbanks
ATTORNEYS.

N. PETERS, Photo-Lithographer, Washington, D. C.

UNITED STATES PATENT OFFICE.

JEREMIAH S. WATSON, OF YORKTOWN, AND CHARLES S. AMBRUSTER, OF ELMER, NEW JERSEY.

FURROWER, MARKER, AND COVERER.

SPECIFICATION forming part of Letters Patent No. 395,602, dated January 1, 1889.

Application filed May 3, 1888. Serial No. 272,675. (No model.)

*To all whom it may concern:*

Be it known that we, JEREMIAH S. WATSON, a citizen of the United States, residing at Yorktown, in the county of Salem, State of New Jersey, and CHARLES S. AMBRUSTER, a citizen of the United States, residing at Elmer, in the county of Salem, in the State of New Jersey, have invented a new and useful Improvement in a Combined Furrower, Marker, and Coverer, which improvement is fully set forth in the following specification and accompanying drawings.

Our invention relates to improvements in a combined furrower, marker, and coverer; and the object of the invention is to combine these implements in a manner whereby each will perform its function with thorough effectiveness.

A further object is to combine the implements and produce a simple and inexpensive machine.

The invention consists of two frames connected by cross-beams, said frames having guiding-wheels at their forward ends and furrowers at their rear ends; further, in two connected frames having guiding-wheels, furrowers, and coverers, said coverers being adjustable vertically and horizontally; further, in two connected frames having guiding-wheels, adjustable coverers, rollers for smoothing the land, furrowers, and a marker pivoted on one of the cross-beams; and, finally, the invention consists in the novel construction, combination, and adaptation of parts for service, as hereinafter described and specifically claimed.

Figure 1:
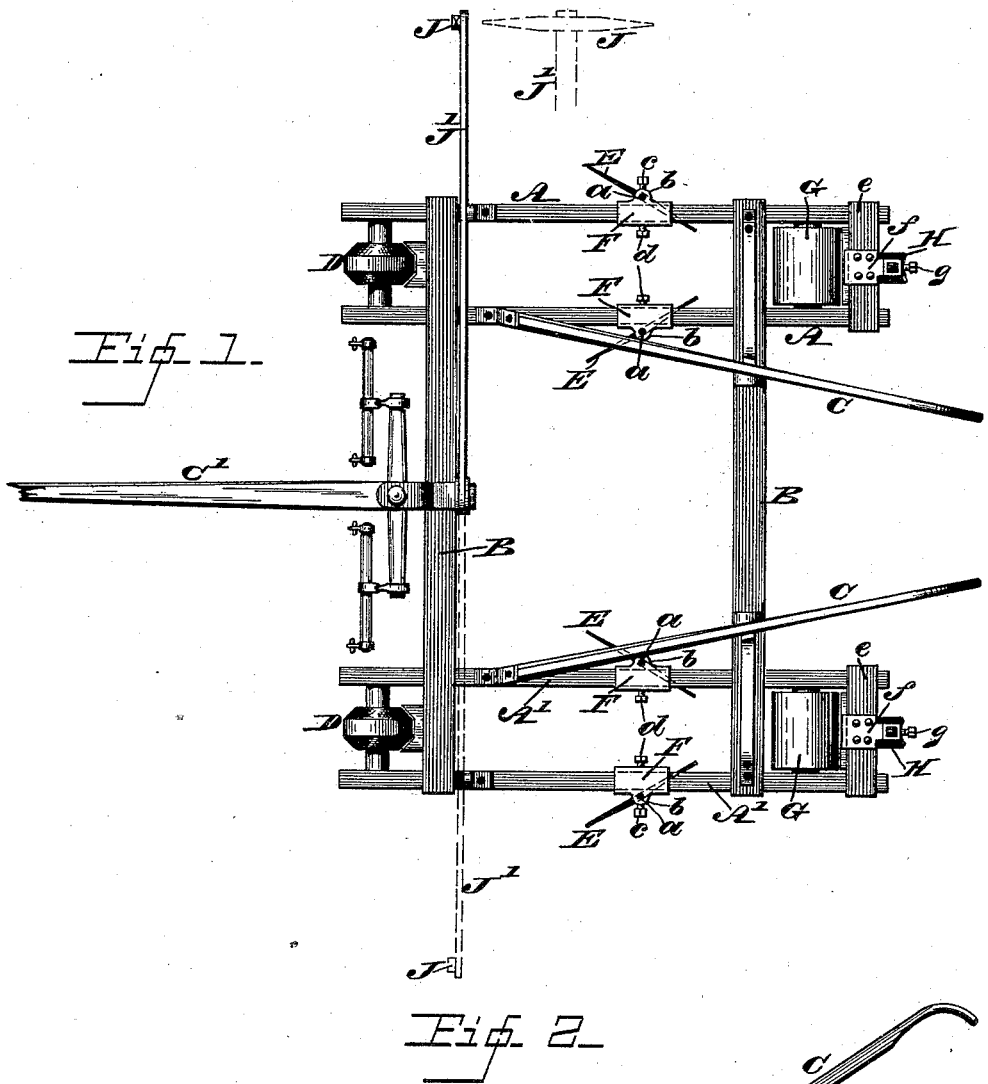
Figure 2:
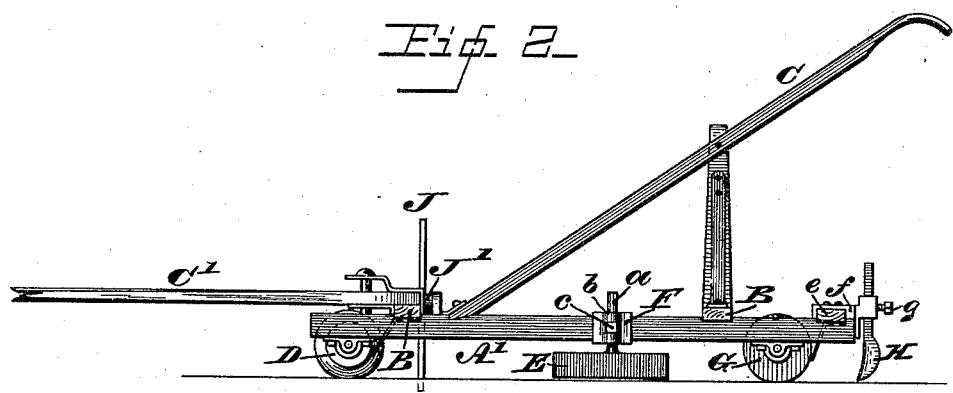

Figure 1 represents a top plan view of a furrower, marker, and coverer embodying our invention. Fig. 2 represents a side elevation of the same.

Similar letters of reference indicate corresponding parts in the two figures.

Referring to the drawings, A and A' designate frames, consisting each of two parallel bars or beams, and these frames are connected by the transverse connecting-beams B.

C designates the handles, and C' designates the draft-pole.

In the forward ends of the frames A and A' are journaled guiding-wheels D, the edges of which are beveled, as shown, to cause them to enter the earth and serve more effectually to guide the device.

E designates the covering blades or plows, two of which are carried by each frame, which are arranged as shown in Fig. 1. These plows are provided with shanks $a$, which enter eyes $b$ in the sleeves F, which latter embrace the side beams of the frames, said plows being vertically adjustable on and removable from the sleeves by means of set-screws $c$. The sleeves are capable of horizontal or longitudinal adjustment on the beams by means of set-screws $d$.

G designates the land-rollers journaled in the frames in the rear of the coverers, and to the rear ends of the frames are secured bars $e$, carrying brackets $f$, in which the furrowers H are removably secured by means of screws $g$.

J designates the marker, having its arm $J'$ pivoted to the forward cross-beam.

The operation is as follows: In first passing over the field the coverers are removed and the implement passes over the ground, furrowing and marking it, after which the seed or grain is sown. The furrowers are now thrown out of operation and the coverers secured in place. The implement, guided by the wheels D, then passes over the furrows which have been formed and in which the seed or grain has been dropped, covering the same completely, and the land-rollers, following in the track of the coverers, press and smooth the earth, thus completing the work.

It is evident that we provide a combined implement each element of which performs its function in a perfect manner; also, which is very simple in construction and can be sold at a very small cost.

Having thus described our invention, what we claim as new, and desire to secure by Letters Patent, is—

1. The herein-described combined furrower, marker, and coverer, consisting of the two connected frames, said frames having guiding-wheels in their forward ends, furrowers in their rear ends, and coverers intermediate of the said guiding-wheels and furrowers, the coverers being capable of a vertical and horizontal adjustment on the frames, substantially as described.

2. In a combined furrower, marker, and coverer, a frame having a pair of coverers each of which is vertically and horizontally adjustable, a roller in the rear of said coverers for smoothing or rolling the land after the coverers have thrown the same in the furrows, substantially as described.

3. The herein-described furrower, marker, and coverer, consisting of two connected frames carrying the guiding-wheels, vertically and horizontally adjustable coverers, land-rollers, furrowers, and the marker pivoted to one of the connecting-beams, all arranged and adapted to serve in the manner and for the purpose described.

4. In a combined furrower, marker, and coverer, a frame having parallel bars, a beveled roller between the forward ends of said bars, coverers adjustably connected with said bars, a land-roller journaled in said bars in the rear of the coverers, and a furrower behind said roller, said parts being combined substantially as described.

JEREMIAH S. WATSON.
CHARLES S. AMBRUSTER.

Witnesses:
ABRAM COCHRAN,
LARNER C. AMBRUSTER.